United States Patent
Hostein et al.

(10) Patent No.: US 10,946,912 B1
(45) Date of Patent: Mar. 16, 2021

(54) CHASSIS ASSEMBLY FOR AUTONOMOUS GROUND VEHICLE

(71) Applicant: Amazon Technologies, Inc., Seattle, WA (US)

(72) Inventors: Nicolas Hostein, Seattle, WA (US); Ennio Claretti, Seattle, WA (US); Nicolas Kurczewski, Seattle, WA (US); Brett Skaloud, Seattle, WA (US); Andrew Stubbs, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/214,672

(22) Filed: Dec. 10, 2018

(51) Int. Cl.
*B62D 63/04* (2006.01)
*B65G 1/04* (2006.01)
*G05D 1/02* (2020.01)

(52) U.S. Cl.
CPC ............ *B62D 63/04* (2013.01); *B65G 1/0492* (2013.01); *G05D 1/02* (2013.01); *G05D 2201/0216* (2013.01)

(58) Field of Classification Search
CPC ........ B62D 63/04; B65G 1/0492; G05D 1/02; G05D 2201/0216
See application file for complete search history.

(56) References Cited

U.S. PATENT DOCUMENTS

| | | | | |
|---|---|---|---|---|
| 2,471,917 | A * | 5/1949 | Wilson | B62D 33/04 296/186.1 |
| 5,877,938 | A * | 3/1999 | Hobbs | G06F 1/183 312/223.2 |
| 7,287,797 | B1 * | 10/2007 | Belloso | B62D 21/03 296/181.2 |
| 9,741,010 | B1 * | 8/2017 | Heinla | G06Q 10/083 |
| D818,397 | S * | 5/2018 | Makela | D12/86 |
| 10,514,690 | B1 * | 12/2019 | Siegel | G05D 1/0027 |
| 10,532,885 | B1 * | 1/2020 | Brady | G06Q 10/083 |
| 10,613,533 | B1 * | 4/2020 | Payson | G06Q 50/28 |
| 2011/0209418 | A1 * | 9/2011 | Drake | B60P 3/34 52/79.5 |
| 2014/0365061 | A1 * | 12/2014 | Vasquez | G05B 19/401 701/23 |
| 2016/0282864 | A1 * | 9/2016 | Lamm | B64C 39/024 |
| 2017/0308098 | A1 * | 10/2017 | Yu | G05D 1/024 |
| 2018/0005169 | A1 * | 1/2018 | High | G06Q 10/06315 |
| 2018/0024554 | A1 | 1/2018 | Brady et al. | |
| 2018/0348792 | A1 * | 12/2018 | O'Brien | G05D 1/0088 |
| 2018/0364711 | A1 * | 12/2018 | Goldfain | G07C 5/085 |
| 2019/0346209 | A1 * | 11/2019 | Miller | F28D 1/05333 |

FOREIGN PATENT DOCUMENTS

EP   3575913 A1 * 12/2019   ........... G05D 1/0268

* cited by examiner

Primary Examiner — Lori L Lyjak
(74) Attorney, Agent, or Firm — BakerHostetler

(57) ABSTRACT

A chassis and skin of a delivery Autonomous Ground Vehicle include an aluminum structure and polymer panels affixed to the AGV by fasteners. The panels are mutually overlapping. A method of assembly includes hooks and clips to put and hold the panels in place during assembly.

18 Claims, 11 Drawing Sheets

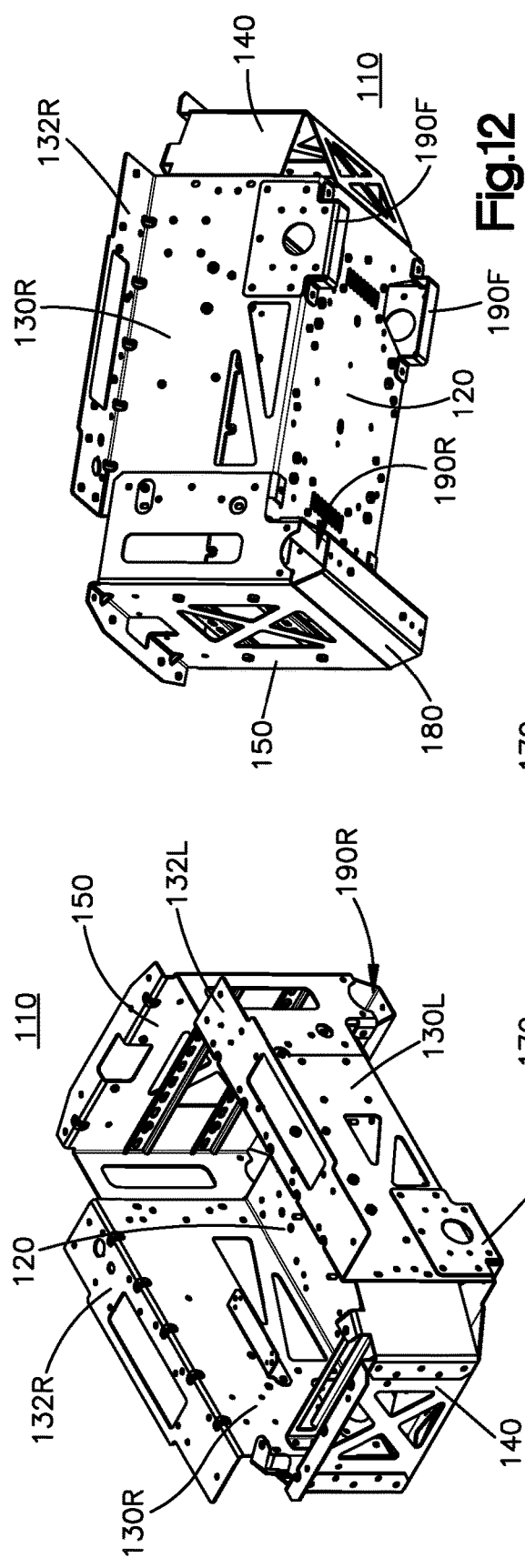
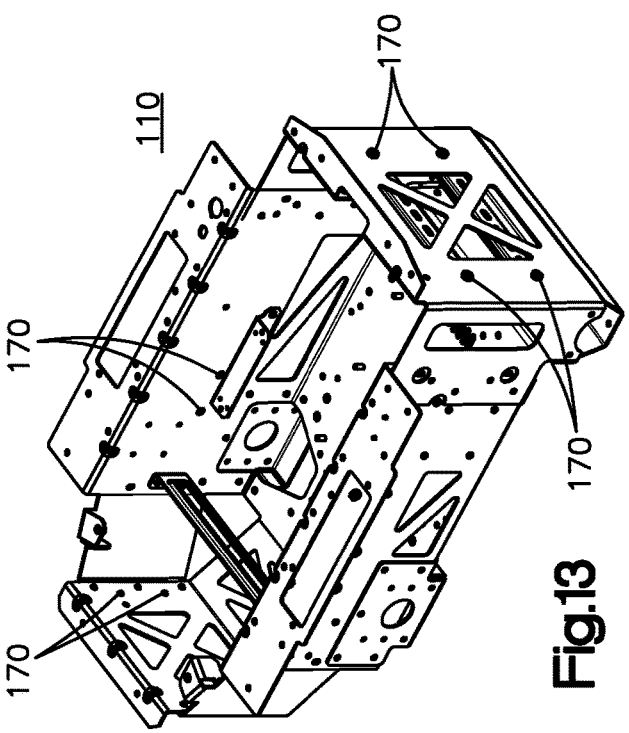
Fig.11
Fig.12
Fig.13

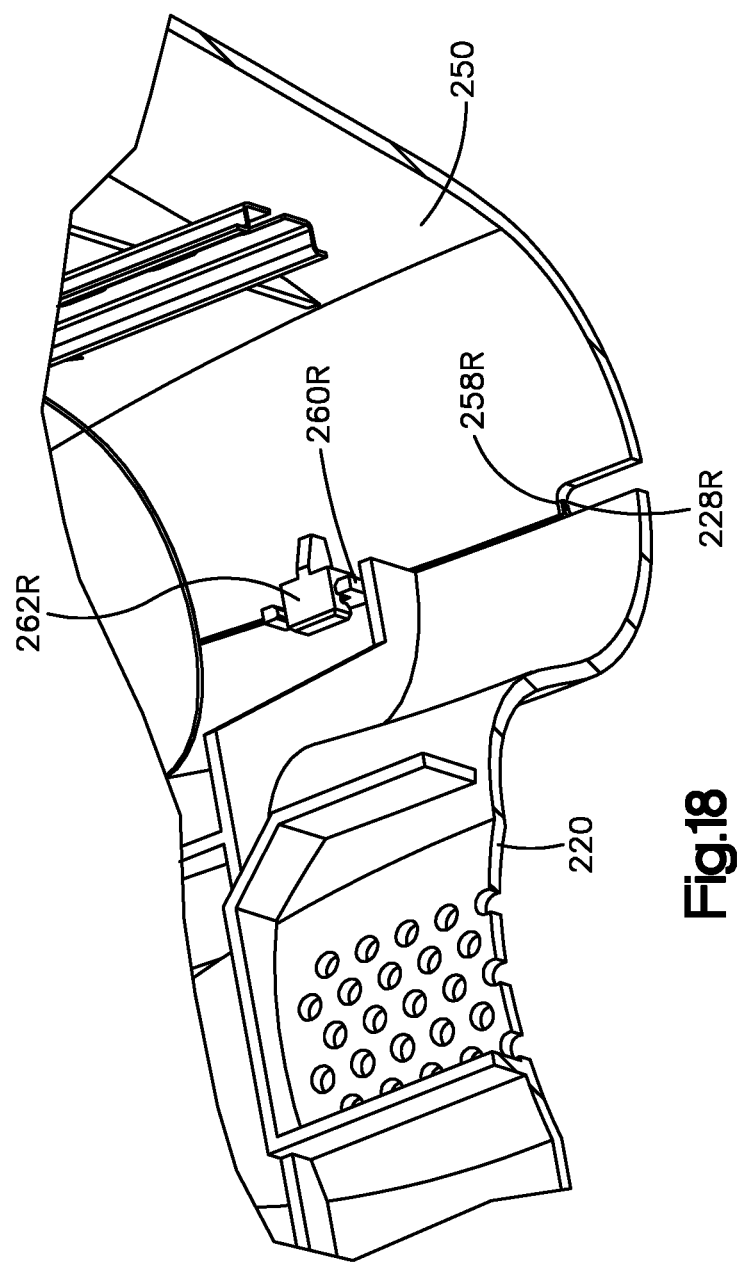

CHASSIS ASSEMBLY FOR AUTONOMOUS GROUND VEHICLE

BACKGROUND

The present invention relates to autonomous ground vehicles, and more particularly to chassis components and systems, and methods relating to same.

Delivery robots have been proposed and disclosed for delivery of various items to an end-customer or business. A typical delivery robot is moveable under its own power and includes a housing that covers or contains a payload, which can include groceries, take-out food orders, and the like. Delivery robots can, in many circumstances, be exposed to weather, such as rain, which can harm electronic parts and electric motors, in addition to harming the payload.

Delivery AGVs often have a body or carriage that is propelled by battery powered, motorized wheels.

BRIEF DESCRIPTION OF THE DRAWINGS

FIG. 11 is a top, front perspective view of the chassis component of the structure of FIG. 2;

FIG. 12 is a top, rear perspective view of the chassis of FIG. 11;

FIG. 13 is a bottom, rear perspective view of the chassis of FIG. 11;

FIG. 18 is an enlarged view of a portion of the structure shown in FIG. 17, including the interface between the bottom panel and rear panel.

DETAILED DESCRIPTION OF ILLUSTRATIVE EMBODIMENTS

Figure 1:
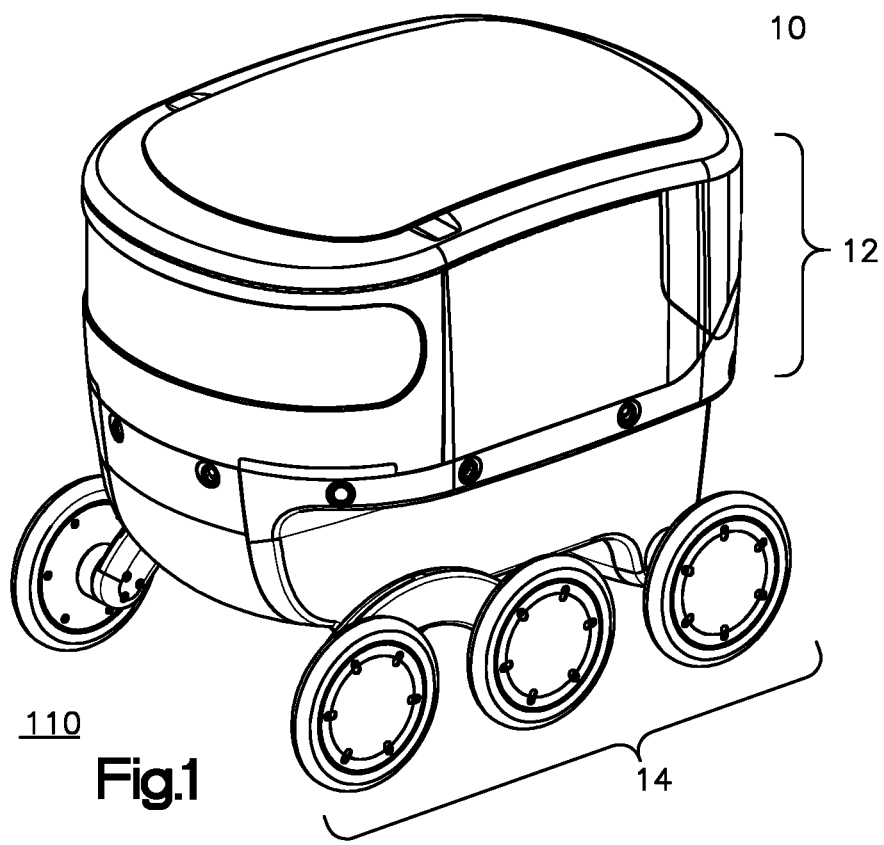
FIG. 1 is a perspective view of a delivery AGV illustrating aspects of the present invention.
Figure 2:
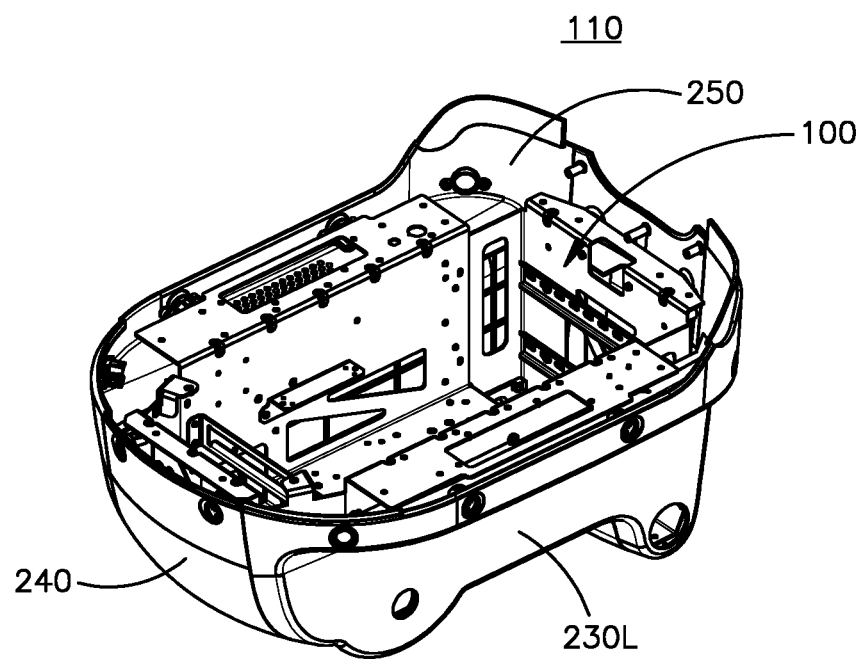
FIG. 2 is a top, front perspective view of a chassis and skin combination of FIG. 1, with its upper portion (including a cargo bay and sensor bays) and drive assemblies removed.
Figure 3:
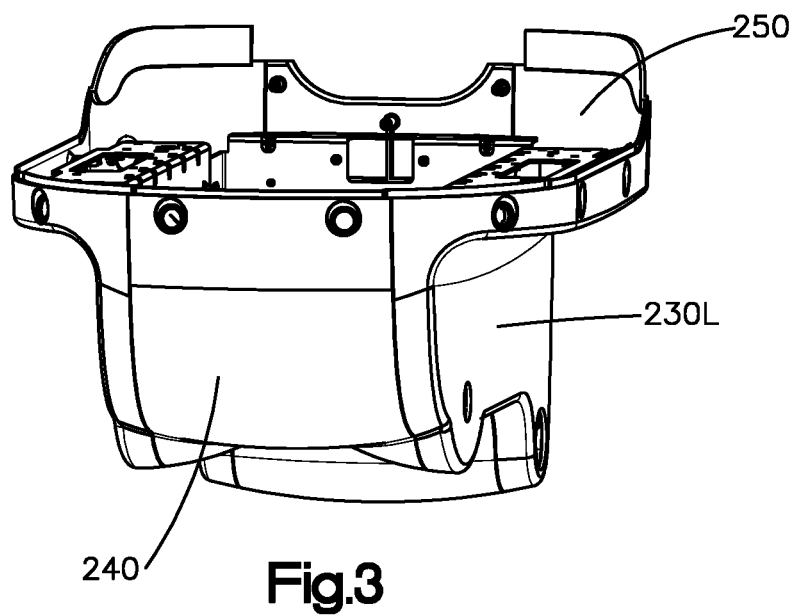
FIG. 3 is another top perspective view of the structure of FIG. 2.
Figure 4:
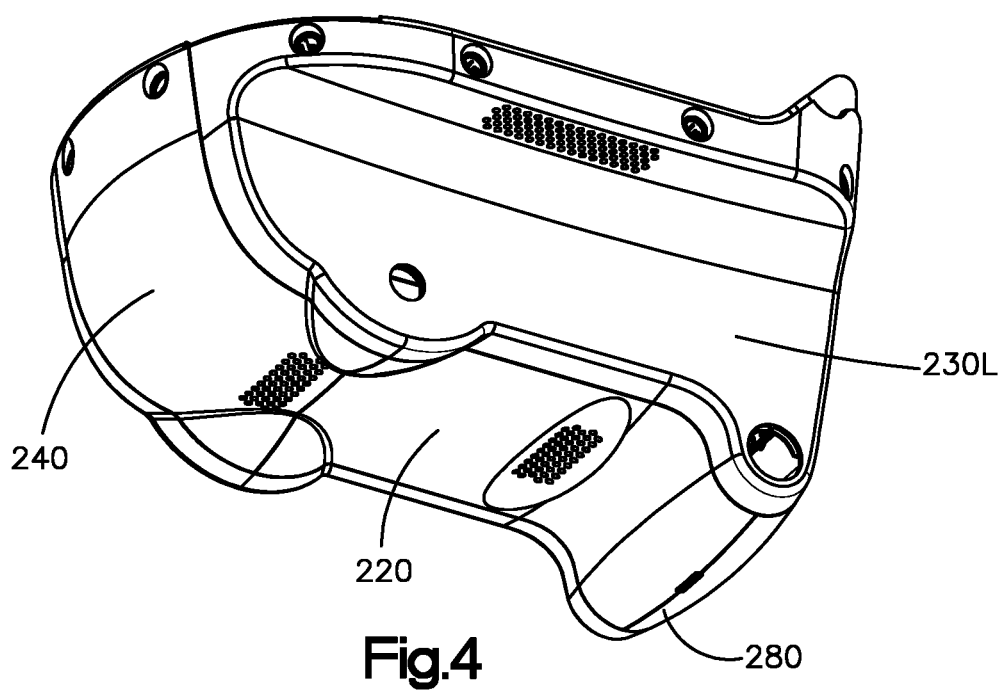
FIG. 4 is a bottom perspective view of the structure of FIG. 2.
Figure 6:
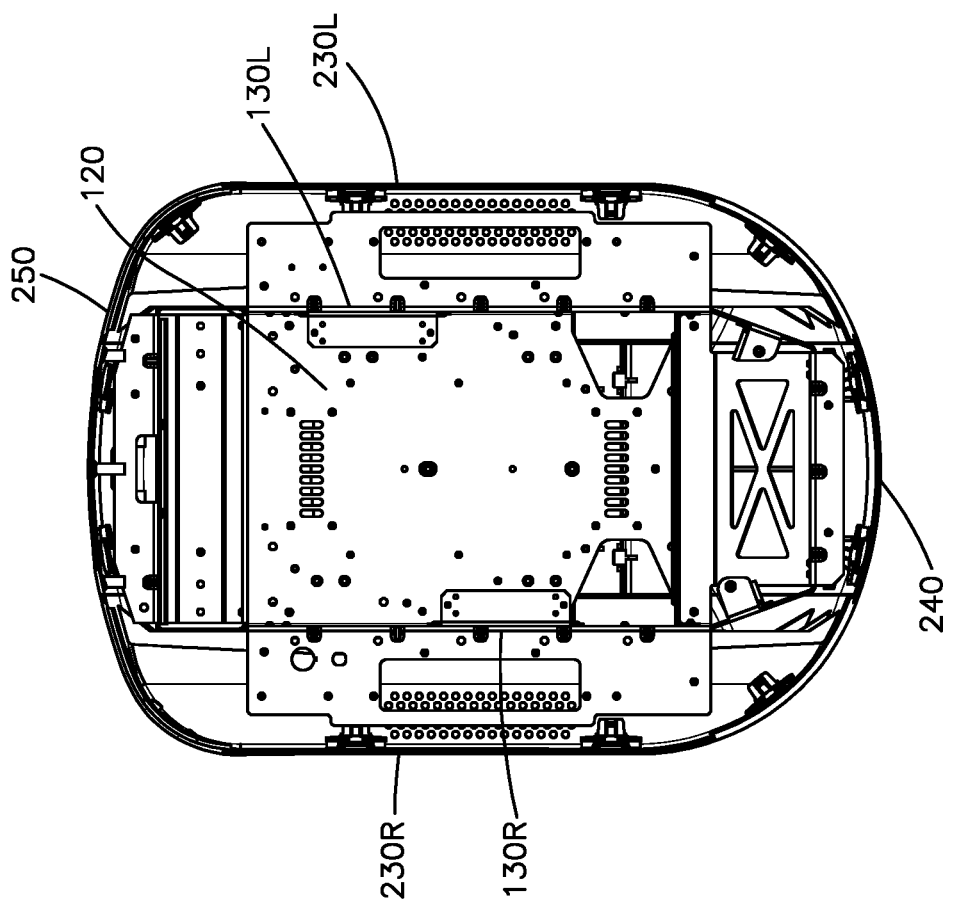
FIG. 6 is a top view of the structure of FIG. 2.
Figure 5:
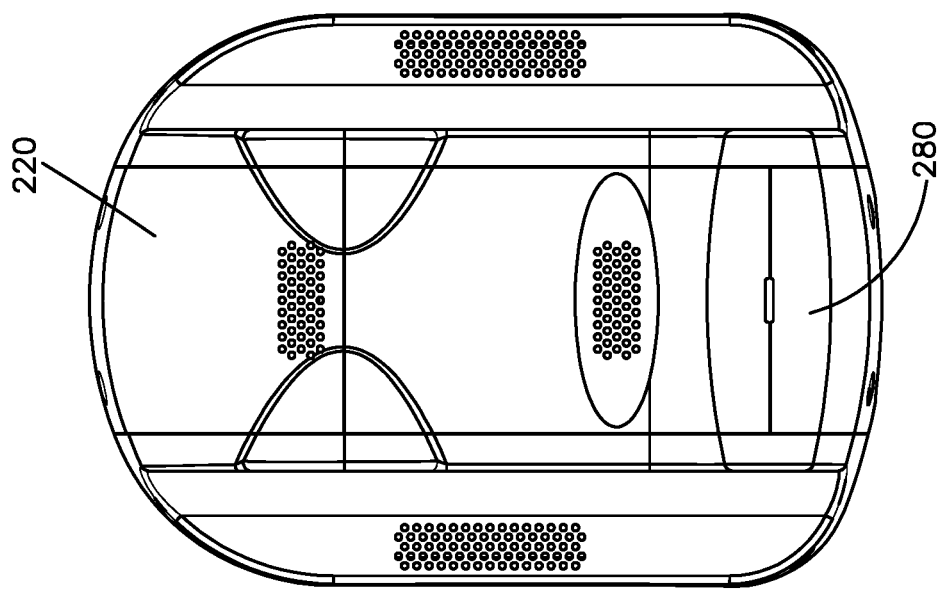
FIG. 5 is bottom view of the structure of FIG. 2.
Figure 7:
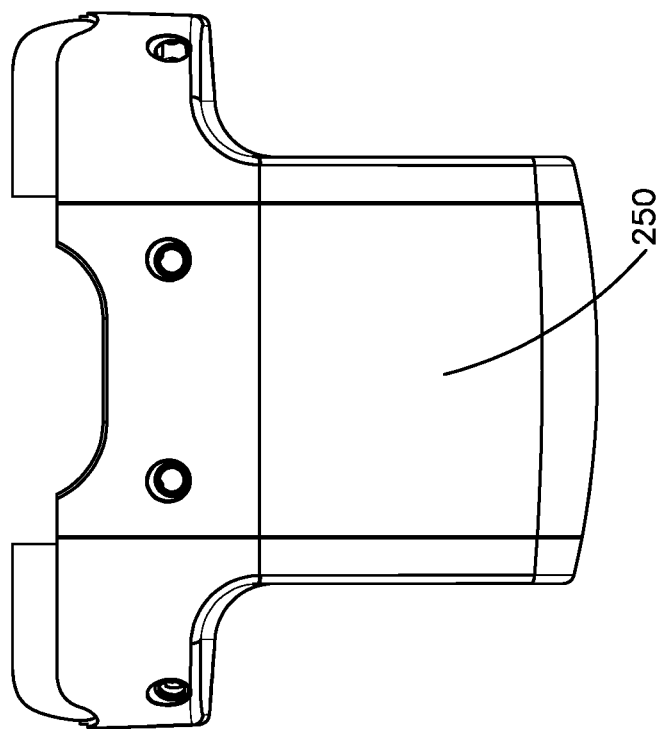
FIG. 7 is a front view of the structure of FIG. 2.
Figure 8:
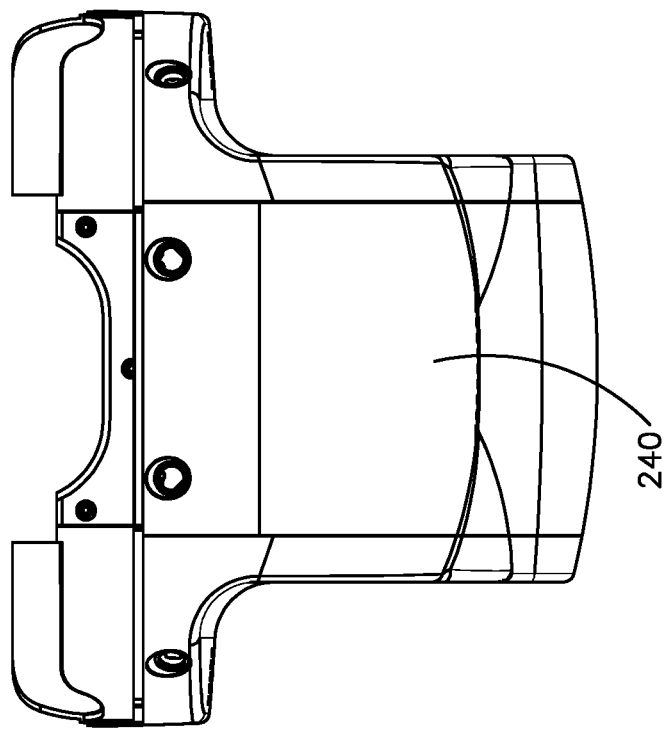
FIG. 8 is a rear view of the structure of FIG. 2.
Figure 9:
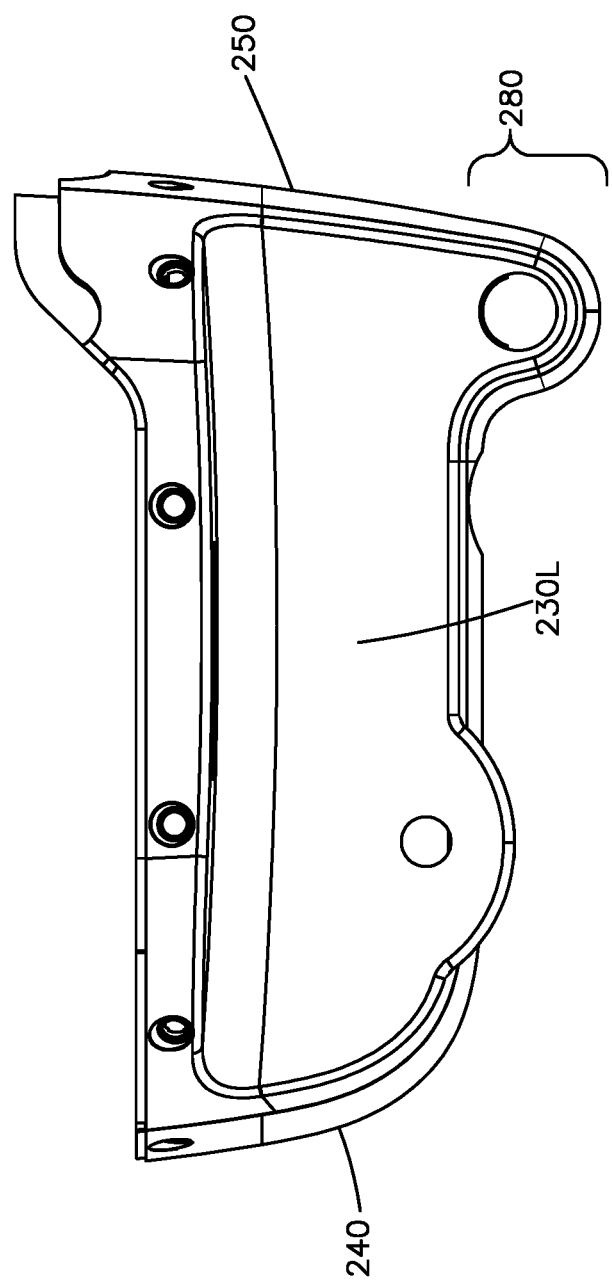
FIG. 9 is a side view of the structure of FIG. 2, with the opposing side being the mirror image of the structure shown in FIG. 9.

An autonomous ground vehicle (AGV) is a category of robot that might operate at times in an unprotected, uncontrolled environment. The term delivery AGV is used for AGV's carrying a payload for delivery purposes. A delivery AGV 10 includes an enclosed cargo compartment, a carriage or body for carrying the cargo compartment, and a drive system.

According to one aspect of the AGV, the body or carriage can include an aluminum sheet metal chassis and a skin formed of interlocking, overlapping panels that are applied to and cover an outboard surface of the chassis. Fasteners connecting the skin to the chassis are applied from the inside such that the skin has a fastener-free exterior surface; none of the fasteners are visible on an exterior of the skin.

According to another aspect of the delivery AGV, the carriage or body includes chassis and an exterior skin. The chassis includes (i) an open top that defines a hardware bay, (ii) front wheel assembly interfaces, and (iii) rear wheel assembly interfaces. Either the front wheel assembly interfaces or the rear wheel assembly interfaces is lower than the other. The exterior skin is connected to the chassis and covers the chassis. The skin includes multiple panels, each of which is connected to a corresponding portion of the chassis by fasteners extending from an inboard face of the chassis into corresponding bosses on the inboard surface of the panel. The panels are at least partially mutually overlapping for water ingress resistance.

The term "panel" is used herein to refer to structures of the skin and is not intended to be limited to any particular structure unless the structure is specified in the claim. For example, the panel may be flat or have a flat portion, but may also be curved, or have curved portions, shoulders, covers, and other features and/or shapes. The fasteners can be any type, such as for non-limiting examples, screws, rivets, interference fit pins that extend into bosses in an interference or tight fit, heat stakes or mechanical stakes that extend from the panels through holes in the chassis and are secured by deformation by heating or mechanical force. Preferably, the fasteners are only visible from inside the body such that each one of the panels has a fastener-free exterior surface.

The panels can include a bottom panel, a pair of opposing side panels, a front panel, and a rear panel. The bottom panel can include bottom longitudinal lips on outboard sides thereof, and each one of the side panels includes a side longitudinal lip, the bottom longitudinal lips and the side longitudinal lips overlap one another. As used herein, the terms "fore and aft" refer to relative directions or orientations consistent with the term "longitudinal" and with the driving direction of the delivery AGV.

The side panels can include fore and aft lateral lips, the front panel can include front lateral lips, and the rear panel can include rear lateral lips. The fore lateral lips of the side panels and the front lateral lips overlap. The bottom panel can include fore and aft transverse lips, the front panel can include a front transverse lip, and the rear panel can include a rear transverse lip. The fore transverse lip of the bottom panel and the front transverse lip overlap one another, and the aft transverse lip of the bottom panel and the rear transverse lip overlap one another. As used herein, the term "lateral lip" does not require that the lip be located on a side, as the lateral lips may be on a corner or on the ends. In the figures, the lateral lips are substantially vertical, but verticality is not required.

The bottom panel and the front panel form a hinge structure (hook and tab) adapted for holding a lower edge of the front panel to the bottom panel while pivoting the front panel relative to bottom panel during assembly of the carriage. The bottom panel and the rear panel form a hinge structure adapted for holding a lower edge of the rear panel while pivoting the rear panel relative to the bottom panel during assembly of the carriage.

The side panels and the bottom panel form a clip structure adapted for holding the side panel relative to the bottom panel during assembly of the carriage. Thus, the side panels can be installed by translating them directly toward and into the chassis. The clips can hold the sides in place for alignment and fastening.

The chassis can include an integral, transverse frame that defines a lowermost part of the chassis. In the embodiment of the figures, the transverse frame is at the rear of the chassis, and other locations are contemplated. The transverse frame is integral with the chassis in that it is part of, not moveable relative to, the chassis. The frame is part of the chassis structure.

Front wheel interfaces are formed by recesses in the chassis sides, and the interfaces may be reinforces with a plate, stiffeners, and like structure. The rear wheel interfaces of the chassis are formed on the transverse frame, which in the figures is at the rear of the AGV, but as explained above can be other locations.

In the embodiment of the figures, the chassis is formed of aluminum sheet and/or structural shapes. Other materials and configurations are contemplated.

According to another aspect of the delivery AGV, a method of assembling a carriage for a delivery autonomous ground vehicle (AGV) adapted for carrying and delivering a payload can include the steps of: (a) affixing a bottom panel to a bottom portion of a chassis; (b) after the affixing step (a), hooking a lower edge of a front panel onto a portion of the bottom panel and rotating the front panel about the bottom panel until the front panel contacts the chassis, and then affixing the front panel to the chassis; (c) after the affixing step (a), hooking a lower edge of a rear panel onto a portion of the bottom panel and rotating the rear panel about the bottom panel until the rear panel contacts the chassis, and then affixing the rear panel to the chassis; and (d) after the affixing step (a), affixing opposing side panels to the carriage.

The affixing step (a) can include fastening the bottom panel to the chassis via fasteners through holes in the chassis into bosses formed on an inboard face of the bottom panel; the affixing step (b) can include fastening the front panel to the chassis via fasteners through holes in the chassis into bosses formed on an inboard face of the front panel; and the affixing step (c) can include fastening the rear panel to the chassis via fasteners through holes in the chassis into bosses formed on an inboard face of the rear panel. Each one of the affixing steps (b) and (c) can include overlapping lips of some panels relative to other panels. The fastening steps can include one of inserting screws, inserting rivets, inserting pins, and deforming heat stakes.

Referring to the figures, a delivery AGV 10 includes an upper assembly 12, a lower assembly or carriage 100, and a driving assembly 14. Upper assembly 20 include a housing, a cargo bay, front and rear electronics bays behind corresponding front and rear windows in the housing, and a lid assembly.

Carriage assembly or body 100 includes a chassis 110 and a skin or shell assembly 210. Chassis 110 in the embodiment of the figures is formed of sheet aluminum walls or plates, including a bottom plate or wall 120, left and right side plates or walls 130L and 130R, a front plate or wall 140, and a rear plate or wall 150. The plates are affixed together to form a structure that is unitary and capable of supporting AGV 10. Chassis 110 has an open top and forms a hardware bay for holding batteries, power component (such as motor controllers, PCBs and the like) and other components as needed. Forward and rearward bays can house sensors and like components.

A rear portion of bottom plate 120 and a bottom portion or rear plate 150 merge into a transverse structure 180, which forms a lowermost portion of chassis 110 and provides structural support for the rear wheel assemblies. Chassis 110 also includes flanges 132L and 132R to support portions of the upper assembly 12. The plates also include holes 170 for receiving screws. Openings for alignment features may also be provided.

Figure 10:
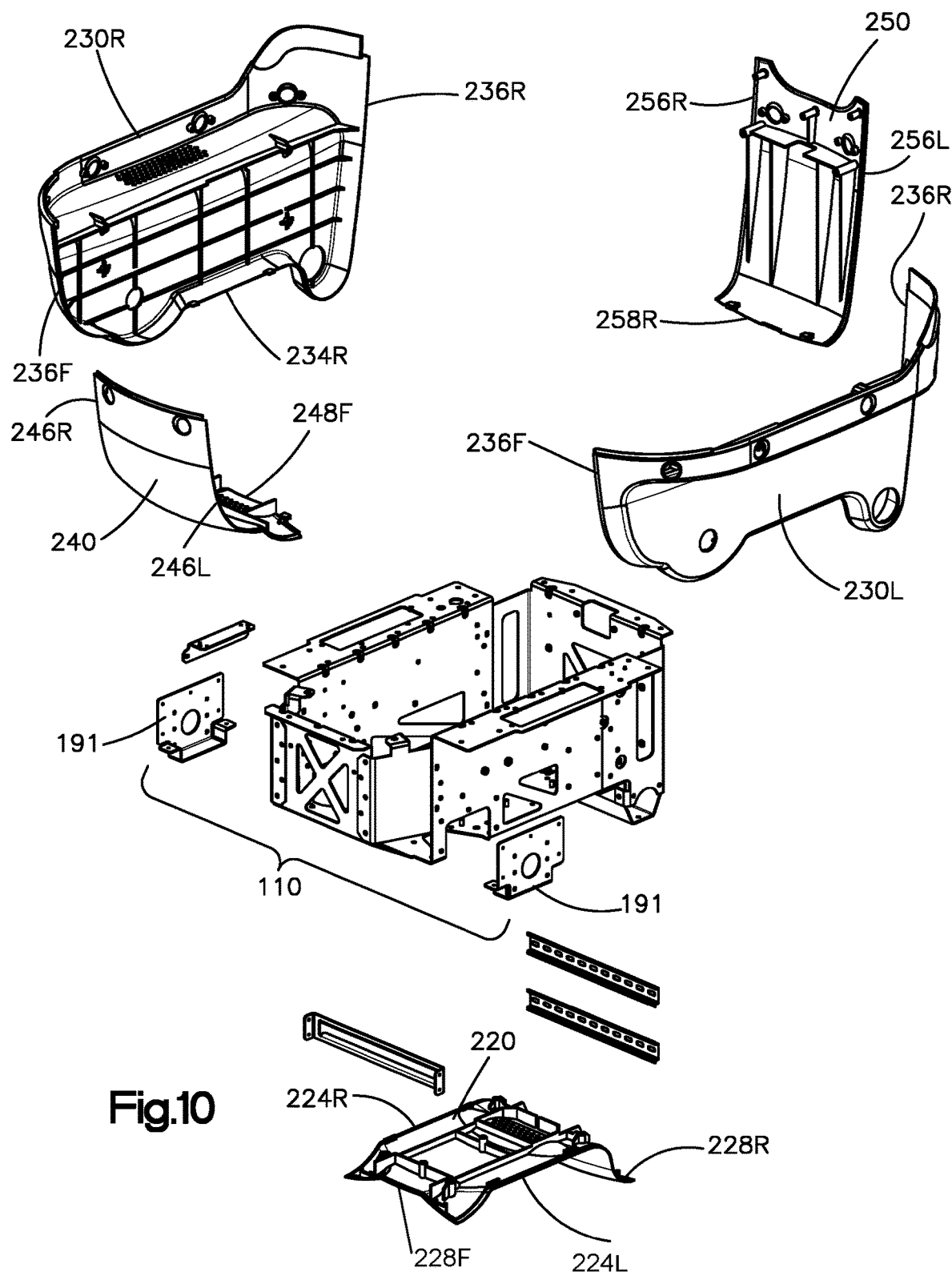
FIG. 10 is an exploded view of the structure of FIG. 2.
Figure 14:
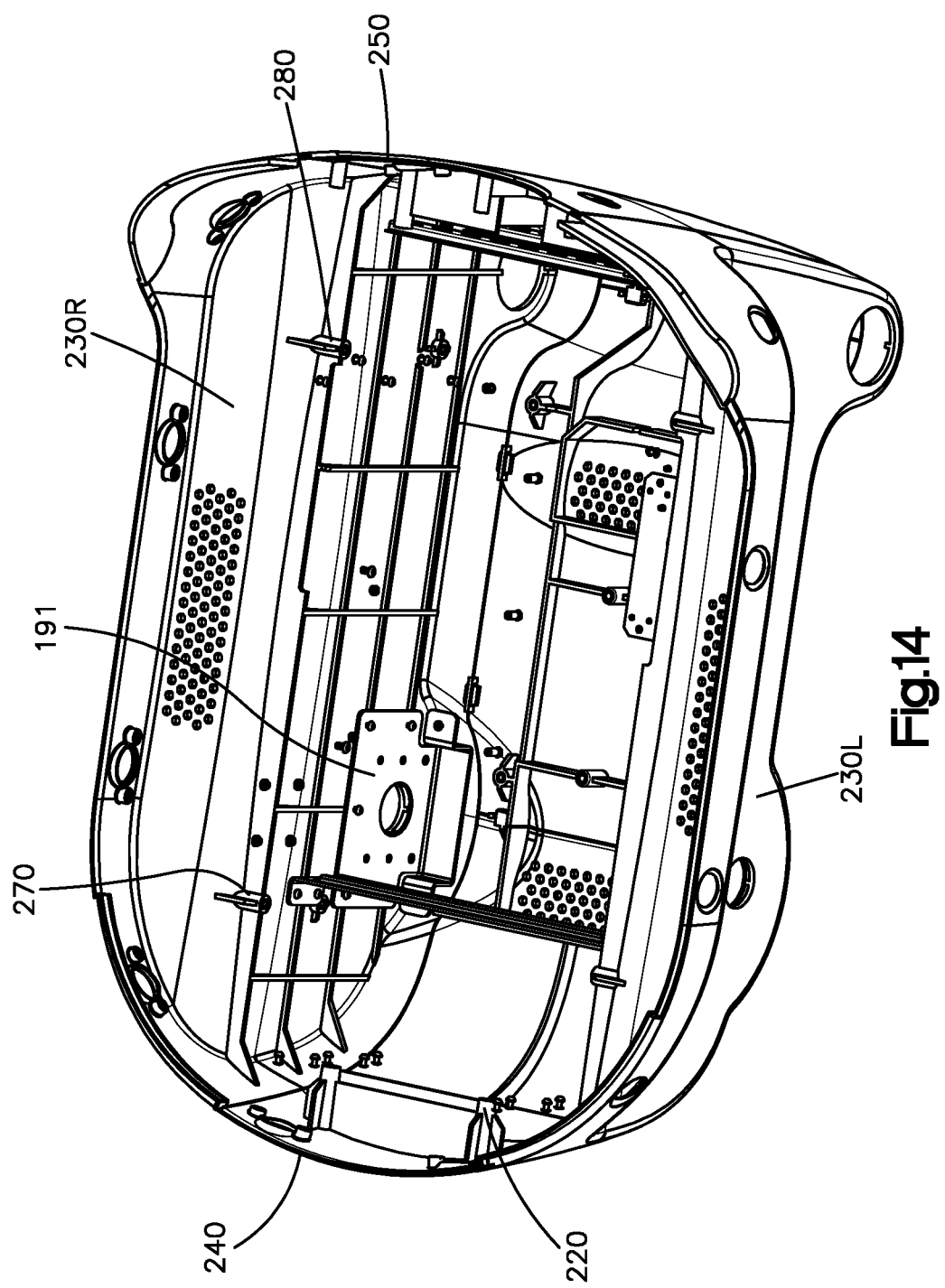
FIG. 14 is a top perspective view of the assembled panels of FIG. 2, with the chassis removed for clarity.

Transverse frame 180 includes structure features forming rear wheel assembly interfaces. A forward portion of chassis 110 includes holes or cutouts housing front wheel assemblies. For example, plates 191 that are part of the motor and wheel assembly are illustrated in FIG. 10. FIGS. 11-13 omit plates 191. Other configurations are contemplated. Frame 180 includes ends 190F and 190R that receive drive wheel motors or structures to secure drive motors to the chassis.

The walls of the chassis include structural and functional features that depend on the particular application, including a tapered nose (that is, front walls 140 tapers when viewed in top view), various openings, tabs, structural cross-members, and the like. The walls of chassis 110 can be formed of any material suitable for supporting the panels and wheel assemblies as the AGV carries the intended load. Aluminum sheet metal is used in the embodiment of the figures. The thickness, specific material, use of stiffeners and other structural supports, and other decisions relating to the material choice and properties can be made according to the particular goals of the AGV, including strength, weight, and like parameters.

Shell 210 includes a bottom panel 220, left and right side panels 230L and 230R, a front panel 240, and a rear panel 250. Shell 210 encloses chassis 110. Panels 220, 230, 240, and 250 encase chassis 110, and are included with relatively flat portions, curved shoulders, and like features for aesthetic and functional purposes. Side, front, and rear panels 220, 230, and 240 are upright, while bottom panel 220 forms the underside of shell 210.

The panels include several features chosen according to the particular parameters of the application, such as openings for ultrasonic sensors, drain holes and air inlets, shoulders and undercuts, provisions for receiving windows for sensor bays, among others. The panels are formed of an appropriate engineering polymer suitable for its intended duty, such as a urethane, polycarbonate, polycarbonate and ABS blend, and the like, as will be understood by persons familiar with outdoor use of polymers in low speed vehicles in view of the present disclosure. The overall weight of the components is a factor in the choice of materials.

The panels can have shapes that vary from the shapes and configurations shown depending on the application parameters. The panels preferably include overlapping lips to prevent ingress of water, such as by splashing or driving rain. In addition, seals or gaskets may be provided. The panels are affixed to the chassis via screws through holes 170 in the chassis that mate with bosses 270 extending inwardly from inboard faces of the panels, as illustrated in the figures. Other configurations are contemplated.

In this regard, bottom panel 220 includes bottom longitudinal lips 224L and 224R at left and right longitudinal edges, and includes fore and aft transverse lips 228F and 228R. Each side panel 230L and 230R includes longitudinal lips 234L and 234R that mate with or overlap with corresponding bottom longitudinal lips 224L and 224R of bottom panel 220. Each side panel also includes fore and aft lateral lips 236F and 236R. Bottom panel 220 also includes a rounded barrel 280 that extends downwardly relative to the remainder of the panel to house transverse frame 180.

Front panel 240 includes a front transverse lip 248F that mates with or overlaps with the front transverse lip 228F of bottom panel 220 at line 238C. Front panel also includes left and right lateral lips 246L and 246R that overlap with or mate with corresponding side transverse lips 236L and 236R.

Rear panel 250 includes a rear transverse lip 258R that mates with or overlaps with the aft transverse lip 228R of bottom panel 220. Rear panel 250 also includes left and right lateral lips 256L and 256R that overlap with or mate with corresponding side aft lips 236R.

Features for holding the panels in place, either temporarily during installation, include clips and hooks, as explain with a method of assembling the panels to the chassis. A complete, structural chassis 110 is first fitted with bottom panel 220 by fastening the two parts together.

Next, hooks 262F that extend downwardly from a lower edge of front panel 240 (preferably two hooks) are inserted over corresponding tabs 260F at or near a front edge of bottom plate 220. Hooks 262 and tabs 260 are on the inboard faces of the panels. As illustrated in the figures, tabs 260 can be open on top to ease receiving the corresponding hooks. Other configuration of hooks and tabs form a hinge are contemplated.

After engaging the hooks with the tabs, the front panel 240 is pivoted relative to bottom plate 220 until it contacts the face of front plate 140 of the chassis. Front panel 240 is affixed to plate 140 by any means, such as fasteners described herein.

Hooks 262R that extend downwardly from a lower edge of rear panel 250 (preferably two hooks) are inserted over corresponding tabs 260R at or near a rear edge of bottom plate 220. After engaging the hooks with the tabs, the rear panel 250 is pivoted relative to bottom plate 220 until it contacts the face of rear plate 150 of the chassis. Rear panel 250 is affixed to plate 150 by any means, such as fasteners described herein.

Figure 15:
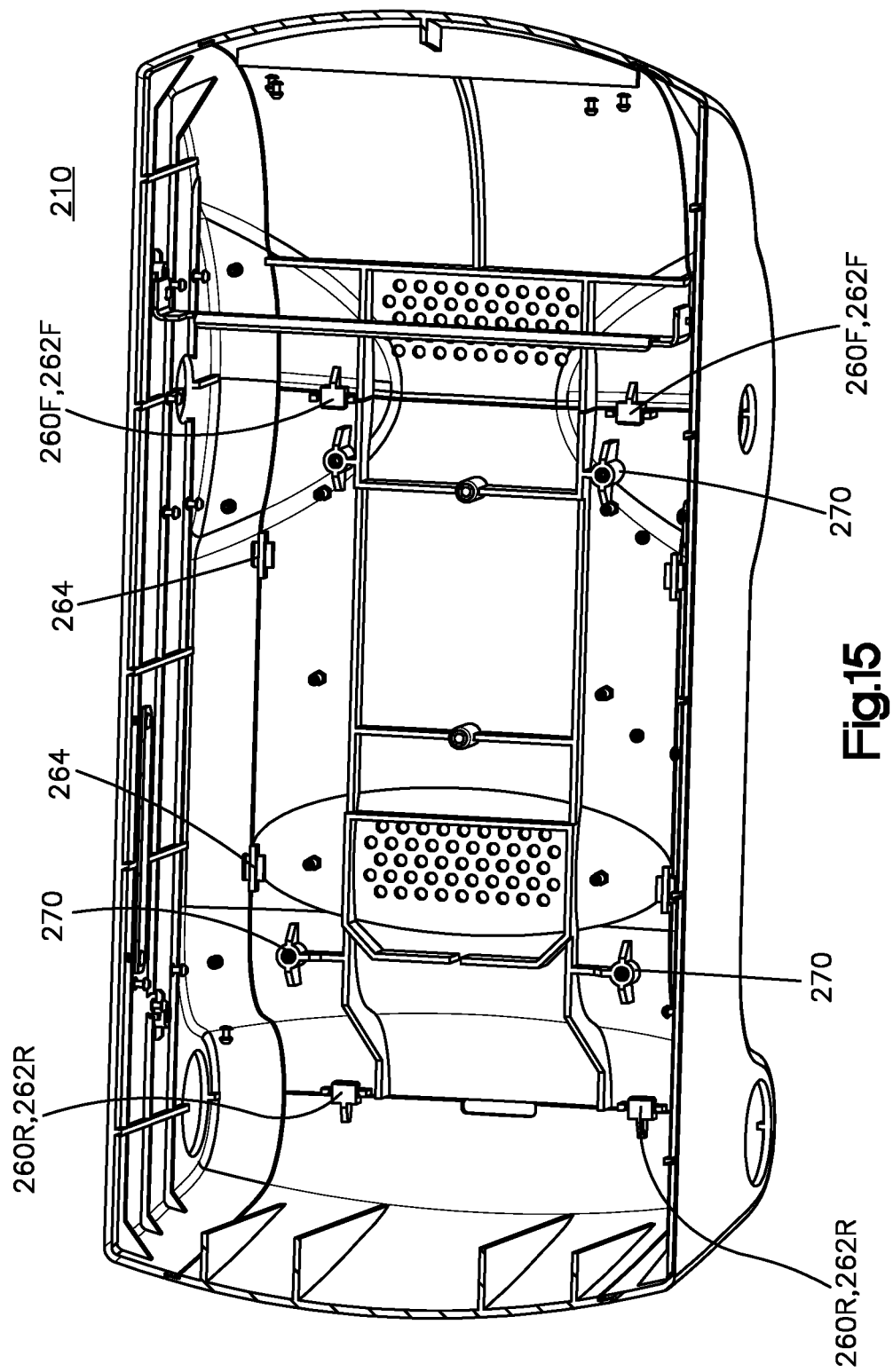
FIG. 15 is another top perspective view of the assembly of FIG. 14 with additional portions removed for clarity.
Figure 16:
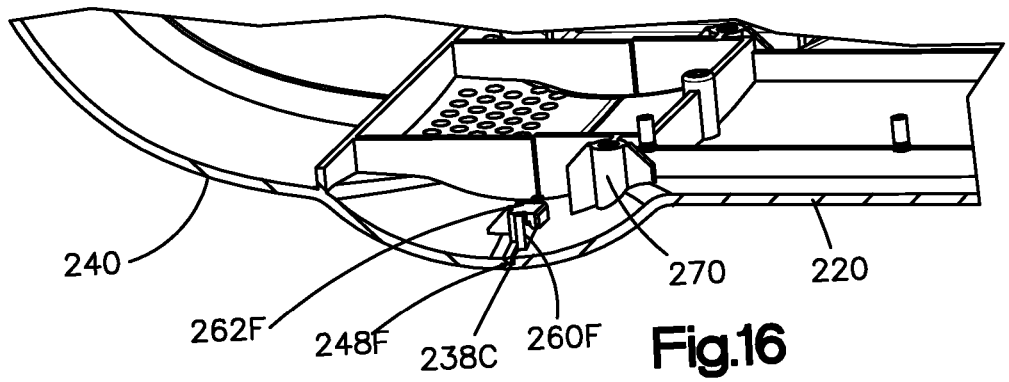
FIG. 16 is an enlarged, cross section portion of the skin of assembly of FIG. 14, illustrating aspects of the bottom and front panels.
Figure 17:
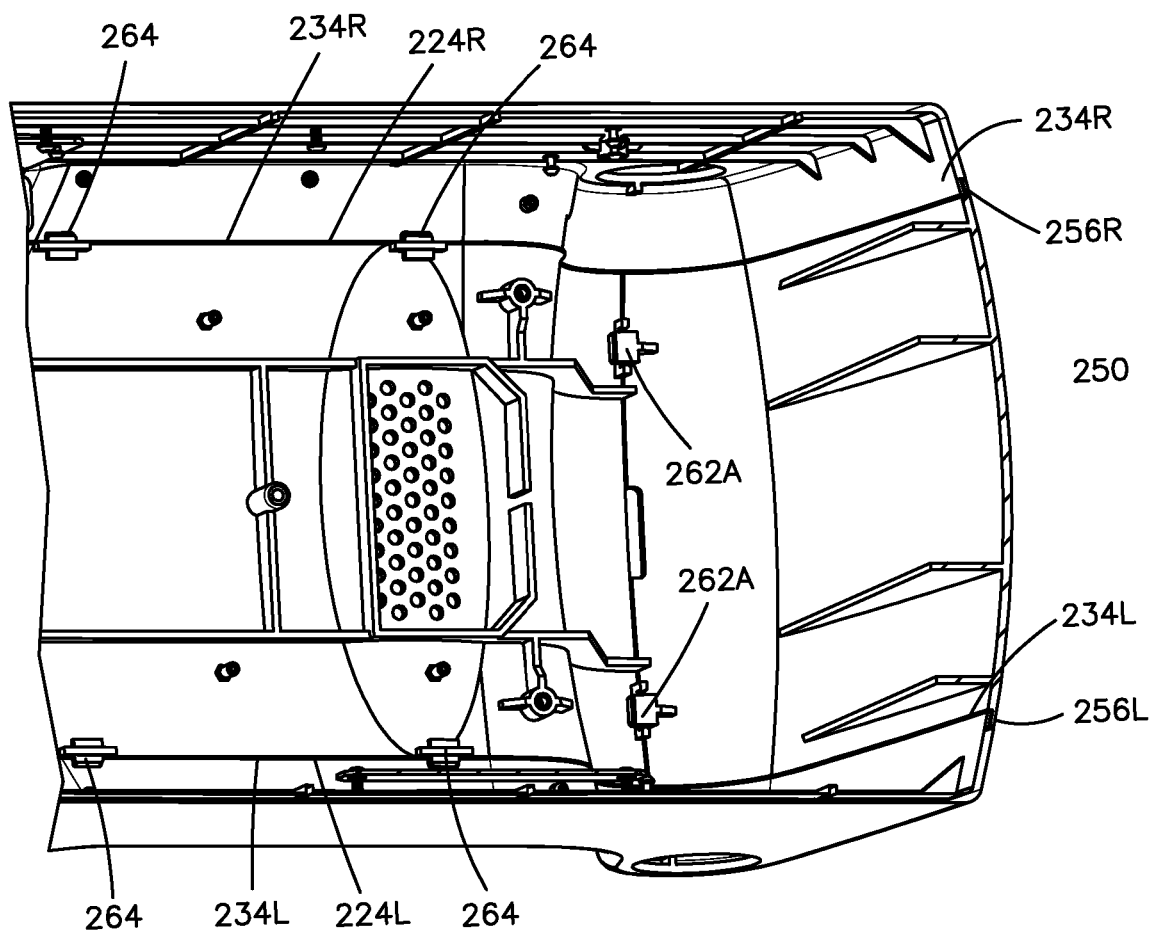
FIG. 17 is an enlarged view of the assembly of FIG. 14 illustrating aspects of the rear, side, and bottom panels (including the barrel form by the bottom panel and the rear panel)

Then the two opposing side panels 230L and 230R can be translated inwardly, with the lips of the panels overlapping the lips of the bottom panel 220 and front and rear panels 240 and 250, such that clips 264 are engaged as shown in FIG. 15. Other overlapping configurations are contemplated.

To illustrate a use and control system of AGV 10 to put the chassis and skin combination in context, a power system (not shown) can be housed in the chassis and can include a power supply, such as conventional rechargeable batteries, and an electric motor to provide power to the wheels. The control system may power both the left and right motors at equal speed to propel AGV 10 in a straight line, may power one motor at a higher speed to turn AGV as needed, and may power the drive wheels in opposing directions to rotate AGV 10 without translation (that is, rotate in place). The control algorithms for controlling the straight-ahead movement, turning, and rotating AGV 10 are well known, as will be understood and employed by persons familiar with battery powered vehicles.

An AGV, both in general and in the context of a delivery AGV disclosed herein, in an uncontrolled, unprotected environment may have the ability to:
  access information about the environment (such as maps of streets, sidewalks, and buildings, and in some cases building interiors);
  detect people, obstacles (such as curbs, steps, bumps, slopes, and the like), objects (such as landscaping, gates, and the like), and surfaces (such as lawns, cobblestones, sidewalk cracks and discontinuities, and the like), and then evaluate and take action based on the detection; and
  travel under its own power to waypoints, usually by battery power and without human navigation assistance, taking into account the above information and detection.

In some circumstances, an AGV's onboard control system may be able to autonomously learn, such as adjusting strategies based on input about the surroundings, adapt to surroundings without outside assistance, and the like.

A particular subset of autonomous ground vehicles is an AGV that navigates to a desired residential or commercial location to carry an object, such as a package containing a commercial product. For example, United States Patent Publication Number 20180024554, titled "Autonomous Ground Vehicles Based At Delivery Locations," which is assigned to the assignee of the present invention, discloses AGVs that retrieve items from transportation vehicles (e.g., delivery trucks) for delivery to specified locations (e.g., user residences, a commercial business, etc.). In various implementations, the AGVs may be owned by individual users and/or may service a group of users in a given area (e.g., in an apartment building, neighborhood, etc.). The AGVs may travel out (e.g., from a user's residence, apartment building, etc.) to meet a transportation vehicle (e.g., a delivery truck on the street) to receive items, and may be joined by other AGVs that have traveled out to meet the transportation vehicle, and may line up in a particular order (e.g., according to delivery addresses, etc.). After the items are received, the AGVs may travel back (e.g., to the user residences) to deliver the items, and may be equipped to open and close access barriers (e.g., front doors, garage doors, etc.). The AGV may also be equipped with a locked lid that can be opened only by an intended recipient.

The present invention uses the phrase "delivery AGV" or "AGV for package delivery" or other combinations of the terms "AGV" and "delivery" to refer to AGVs having the structure, capabilities and function to navigate to a desired location, such as by navigating public or private sidewalks or neighborhoods, to transport a package to a desired customer or residential or commercial location. Accordingly, a delivery AGW includes an internal chamber for holding a package payload and is limited in speed, such as to 6 mph, 10 mph, or 15 mph, as determined by the particular design guidelines and possibly by state regulation. In this regard, these speed are referred to herein as low speed.

The control system includes sensors and other components and systems used for navigation and guidance, avoiding objects, image-capture and sensing, power management, communications, security, and other functions inherent in achieving the goals of a delivery AGV. Sensors can be mounted behind a forward facing panel and/or a rearward facing panel (not shown). Sensors can include cameras having images sensors including image signal processing, light sensors, and the like, with corresponding processing including image decoding, lens correction, geometrical transformation, video stream transcoding, video analytics, image capture, and compression to provide obstacle detection and obstacle identification. Sensors for determining speed may also be employed. Panels can be transparent polymer, such as (for example) acrylic, Plexiglas, or polycarbonate.

Sensors can include RADAR sensors, such as SRR (Short-range radar) applications and MRR/LRR (mid-range radar, long-range radar) applications; LIDAR sensors, such as infrared LIDAR systems that with the aid of a Micro-Electro-Mechanical System (MEMS), which use a rotating laser, or a solid-state LIDAR. Control system can also include GPS modules, inertial guidance modules such as an inertial measurement unit (IMU) having gyroscopes and accelerometers (preferably in each of the x, y, and x directions), power management modules to control power, overall consumption, and thermal dissipation. Other modules, components and functions are contemplated.

Control system and sensors may also be employed in controlling the driving and turning of AGV 10 during normal conditions. For example, a speed sensor on the wheels, sensors on motor current and/or voltage, GPS, accelerometer, gyroscope, optical sensors, and the like may be employed to determine a safe straight-ahead speed, safe turning radius and velocity for the vehicle and package (taking into account the possibility of encountering a person who might not see or be expecting the vehicle), safe stopping distance to provide feedback to the controller for determining the speed, and the like.

Control system may also include a package delivery module and corresponding sensors. For example, a sensor can be associated with a closed position of lid to assure that a package to be delivered to a residential or commercial destination is secure in chamber during transport. A means for unlocking a lock on lid (or unlocking a actuator for lid or like means) can include a keypad, a wireless communication system (for working with Wi-Fi, cellular data, Bluetooth, NFC or other communication means to send a signal to the lock upon verification), a facial or fingerprint recognition module, or the like may also be included.

Control system can control the movement of AGV to a desired destination, the delivery of a package within chamber to an authorized recipient, and/or movement of AGV 10 to a home location. In this regard, the description of control system and sensors, and United States Patent Publication Number 20180024554 and/or industry practice in view of the present disclosure may inform the functions in this regard.

The present invention is illustrated employing particular structure and function. The present invention is not limited to the structure and function specifically described herein. Rather, person familiar with the technology will understand variations encompassed by the description. According, it is intended that the claims be given their full scope.

We claim:

1. A carriage for a delivery autonomous ground vehicle (AGV) adapted for carrying and delivering a payload; the carriage comprising:
    an aluminum sheet metal chassis;
    a skin formed of interlocking, overlapping panels applied to and covering an outboard surface of the chassis via fasteners, the skin having a fastener-free exterior surface such that none of the fasteners are visible on an exterior of the skin.

2. A carriage for a delivery autonomous ground vehicle (AGV) adapted for carrying and delivering a payload; the carriage comprising:
    a chassis including (i) an open top that defines a hardware bay, (ii) front wheel assembly interfaces, and (iii) rear wheel assembly interfaces; one of the front wheel assembly interfaces and the rear wheel assembly interfaces being lower than the other one of the front wheel assembly interfaces;
    an exterior skin connected to the chassis and adapted for covering the chassis, the skin including multiple panels, each panel being connected to a corresponding portion of the chassis by fasteners extending from an inboard face of the chassis into corresponding bosses on the inboard surface of the panel; the panels being at least partially mutually overlapping for water ingress resistance.

3. The carriage of claim 2 wherein each one of the panels has a fastener-free exterior surface such that none of the fasteners of the skin are visible from an exterior of the delivery AGV.

4. The carriage of claim 3 where the panels include a bottom panel, a pair of opposing side panels, a front panel, and a rear panel.

5. The carriage of claim 4 wherein the bottom panel includes bottom longitudinal lips on outboard sides thereof, and each one of the side panels includes a side longitudinal lip, one of the bottom longitudinal lips and the side longitudinal lips overlapping the other one of the side longitudinal lips and the bottom longitudinal lips.

6. The carriage of claim 5 wherein each one of the side panels includes fore and aft lateral, the front panel includes front lateral lips, and the rear panel includes rear lateral lips: one of fore lateral lips of the side panels and the front lateral lips overlapping the other one of the fore lateral lips and the front lateral lips.

7. The carriage of claim 6 wherein the bottom panel includes fore and aft transverse lip, the front panel includes a front transverse lip, and the rear panel includes a rear transverse lip; one of the fore transverse lip of the bottom panel and the front transverse lip overlapping the other one of the fore transverse lip and the front transverse lip; and one of the aft transverse lip of the bottom panel and the rear transverse lip overlapping the other one of the aft transverse lip and the rear transverse lip.

8. The carriage of claim 4 wherein the bottom panel and the front panel form a hinge structure adapted for holding a lower edge of the front panel to the bottom panel while pivoting the front panel relative to bottom panel during assembly of the carriage.

9. The carriage of claim 8 wherein the bottom panel and the rear panel form a hinge structure adapted for holding a lower edge of the rear panel while pivoting the rear panel relative to the bottom panel during assembly of the carriage.

10. The carriage of claim 9 wherein the side panels and the bottom panel form a clip structure adapted for holding the side panel relative to the bottom panel during assembly of the carriage.

11. The carriage of claim 3 wherein the chassis includes an integral, transverse frame that defines a lowermost part of the chassis.

12. The carriage of claim 11 wherein one of the front wheel assembly interfaces and the rear wheel assembly interfaces of the chassis are formed on the transverse frame.

13. The carriage of claim 3 wherein the bottom panel, the side panels, the front panel and the rear panel are formed of a material comprising a polymer.

14. A method of assembling a carriage for a delivery autonomous ground vehicle (AGV) adapted for carrying and delivering a payload, comprising the steps of:
    (a) affixing a bottom panel to a bottom portion of a chassis;
    (b) after the affixing step (a), affixing opposing side panels to the carriage;
    (c) after the affixing step (a), hooking a lower edge of a front panel onto a portion of the bottom panel and rotating the front panel about the bottom panel until the front panel contacts the chassis, and then affixing the front panel to the chassis; and (d) after the affixing step (a), hooking a lower edge of a rear panel onto a portion of the bottom panel and rotating the rear panel about the bottom panel until the rear panel contacts the chassis, and then affixing the rear panel to the chassis.

15. The method of claim 14 wherein the step (c) of affixing the front panel and the step (d) of affixing the rear panel occur after the step (b) of affixing the side panels.

16. The method of claim 14 wherein the affixing step (a) includes fastening the bottom panel to the chassis via fasteners through holes in the chassis into bosses formed on an inboard face of the bottom panel; the affixing step (b) includes fastening the front panel to the chassis via fasteners through holes in the chassis into bosses formed on an inboard face of the front panel; and the affixing step (c) includes fastening the rear panel to the chassis via fasteners through holes in the chassis into bosses formed on an inboard face of the rear panel.

17. The method of claim 15 wherein each one of the affixing steps (b) and (c) including overlapping lips of some panels relative to other panels.

18. The method of claim 15 wherein the fastening steps include one of inserting screws, inserting rivets, inserting pins, and deforming heat stakes.

\* \* \* \* \*